United States Patent [19]
Okino et al.

[11] Patent Number: 5,929,979
[45] Date of Patent: Jul. 27, 1999

[54] SCANNING EXPOSURE DEVICE

[75] Inventors: Yoshiharu Okino; Atsushi Uejima, both of Ashigarakami-gun, Japan

[73] Assignee: Fuji Photo Film Co., Ltd., Kanagawa, Japan

[21] Appl. No.: 08/977,057

[22] Filed: Nov. 25, 1997

[30]  Foreign Application Priority Data

Nov. 25, 1996 [JP] Japan .................................. 8-313812

[51] Int. Cl.⁶ ............................. G03B 27/70; G02B 26/08
[52] U.S. Cl. .............................................. 355/60; 359/204
[58] Field of Search ................................ 355/32, 53, 60; 353/31, 34; 359/216, 217, 204

[56]  References Cited

U.S. PATENT DOCUMENTS

| | | | |
|---|---|---|---|
| 5,557,446 | 9/1996 | Kato | 359/206 |
| 5,573,894 | 11/1996 | Kodama et al. | 430/394 |
| 5,734,489 | 3/1998 | Shiraishi et al. | 359/205 |
| 5,781,325 | 7/1998 | Sekikawa | 359/216 |
| 5,793,515 | 8/1998 | Sekikawa | 359/216 |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57]  ABSTRACT

Scanning exposure for three pigments by three optical beams is carried out during a single main scanning. An angle of incidence and an angle between respective light beams are determined so as to prevent overlapping of scanning exposure. As a result, a single modulator can be used in modulating light beams. With respect to maximum swing angle of light beam by a flat mirror of a deflecting device, a image can be recorded (scanning exposure) on a sensitive material by a swing angle of about ⅓ by allocating swing width with respect to the center. Thus, a deviation of position of a focusing point and change in speed can be suppressed so that focusing, concentration and the like can be included within an allowable range.

20 Claims, 7 Drawing Sheets

F I G. 1
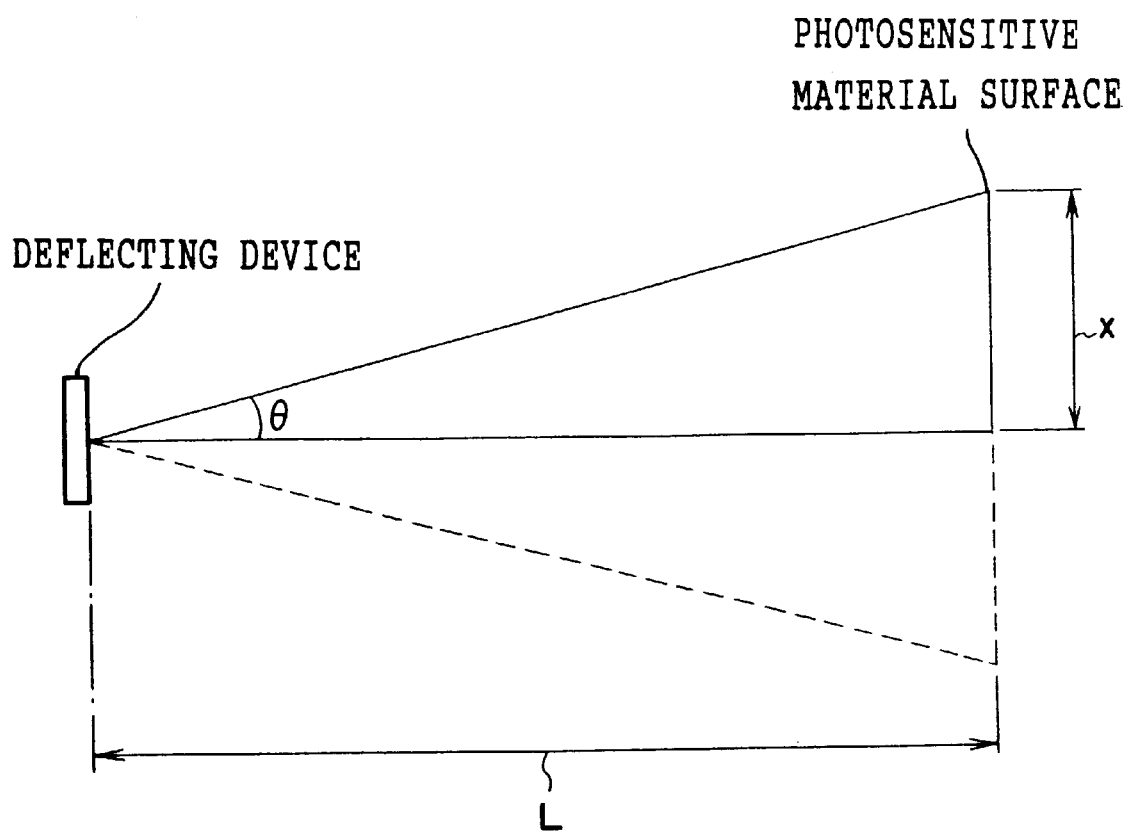

SCANNING EXPOSURE DEVICE

BACKGROUND OF THE INVENTION

1. Field of the Invention

This invention relates to a scanning exposure device wherein a light beam is transmitted upon a flat deflecting device and the reflected light is swept to scan and expose a scanning plane.

2. Description of the Related Art

Generally, a scanning device using laser beam includes a flat deflecting device (e.g., a rotary polygon mirror, etc.) for scanning the light beam, and a focusing lens disposed downstream of the deflecting device. Then, light beams scanned by the flat deflecting device are focused along a plane. A so-called pre-objective type optical system in which a focusing lens is disposed downstream of the deflecting device is known.

In this case, an optical system in which a focusing position in the direction of the optical axis and accuracy of the focused beam position in the scanning direction are taken into account, is demanded. An example is the fθ lens which is most commonly used.

The pre-objective type optical system using the fθ lens is excellent in focusing position accuracy, uniformity of beam diameter and the like. However, because a large lens and high precision are required, there is a disadvantage that the price is very high. Another idea is to focus a plurality of beams having different wavelengths by means of a single fθ lens so as to expose color images. In this case, it is difficult to obtain uniform focusing performance. Depending on the swing angle, the transmission rate differs with wavelength. Depending on this angle, shading, a phenomenon involving tint changes, occurs. Thus, image quality drops.

On the other hand, as a scanning optical system which uses no fθ lens, the so-called post-objective type optical system in which the focusing lens is disposed upstream of the deflecting device is known.

This post-objective type optical system is advantageous because its focusing lens is small and so, economical. However, because the focusing position is circular and scanning is performed at angular speed, when a flat type light sensitive material is exposed with the post-objective type optical system, uniformity of beam diameter, accuracy of scanning position, uniformity of scanning speed and other properties are generally inferior to those of the method using the fθ lens.

Thus, in the post-objective type optical system, the deflecting device is equipped with curvature or a special lens to correct the focusing characteristic, so as to compensate for the aforementioned deterioration of characteristics.

However, to provide the deflecting device with curvature, a special processing machine and skill for cutting a curved mirror are required, and therefore costs increase.

On the other hand, when a correction lens is interposed, a large non-spherical lens is required to obtain an excellent result, so that an enlargement of the device and a rise in production cost are brought about.

SUMMARY OF THE INVENTION

Accordingly, it is an object of the present invention to provide a image scanning device capable of realizing an excellent focusing characteristic considering the above described matter and using a flat deflecting device, without requiring an optical system for correction.

According to a first aspect of the present invention, there is provided a scanning exposure device having a focusing element between a light source and a flat deflecting device, in which the deflecting device is a rotary mirror having one mirror or a plurality of mirrors and Expression (1) is satisfied, $$\theta \leq 33° \quad (1)$$

where θ is a scanning swing angle (swing angle corresponding to a center of scanning to ends thereof) by the deflecting device.

Because the focusing element is disposed between the light source and flat deflecting device according to the first aspect of the present invention, an expensive fθ lens is not required to be used. Further, because the scanning swing angle is set to less than 33°, the uniformity of the scanning speed for the sensitive material is excellent and the uniformity of concentration is excellent and further, such an exposure in which the uniformity of beam diameter is excellent can be done.

According to a second aspect of the present invention, there is provided a scanning exposure device having a focusing element between a light source and a flat deflecting device, in which the deflecting device is a rotary mirror having one mirror or a plurality of mirrors and Expression (2) is satisfied, $$\theta \leq 17° \quad (2)$$

where θ is a scanning swing angle (swing angle corresponding to the center of scanning to ends thereof) of the deflecting device.

According to the second aspect of the present invention, because the scanning swing angle is set to less than 17°, the uniformity of the scanning speed for the sensitive material is excellent and the uniformity of concentration is excellent and further, such an exposure in which the uniformity of beam diameter is excellent can be done.

According to a third aspect of the present invention, there is provided a scanning exposure device having a focusing element between a light source and a flat deflecting device, in which the deflecting device is a rotary mirror having one mirror or a plurality of mirrors and an exposure plane exists between a beam waist position in which the image height is zero and a beam waist position in which the image height is maximal.

According to the third aspect of the present invention, because the exposure plane is located between the beam waist position of the center of the scanning and the beam waist positions of the ends thereof against the beam which focus as circular, the change rate of the beam diameter on the sensitive material surface can be reduced to about ½ as compared to the case in which the sensitive material surface is located only at the beam waist position in the center of the scanning.

According to a fourth aspect of the present invention, there is provided a scanning exposure device having a focusing element between a light source and a flat deflecting device, in which the deflecting device is a rotary mirror having one mirror or a plurality of mirrors and Expression (3) is satisfied, $$\cos^2\theta + (2\lambda L(1-\cos\theta)/(\pi\omega_0^2))^2 \leq 1.44 \quad (3)$$

where λ is wavelength of light beam, $\omega_0$ is minimum beam diameter within an exposure surface, L is a distance from a point of the deflecting device from which light beam is reflected, to a center of scanning of the exposure surface, and θ is scanning swing angle (swing angle corresponding to a center of scanning to ends thereof, namely, angle corresponding to zero image height to maximum image height) caused by the deflecting device.

According to the fourth aspect of the present invention, because the beam wavelength, beam diameter, a distance between the deflecting device and exposure surface and scanning swing angle are set so as to satisfy the expression (3), it is possible to expose a image in which a change in the beam diameter is less than 50% and an excellent sharpness is secured.

According to a fifth aspect of the present invention, there is provided a scanning exposure device according to the third aspect thereof, in which Expression (4) is satisfied, $$\cos^2\theta + (2\lambda L(1-\cos\theta)/(\pi\omega_0^2))^2 \leq 1.44 \qquad (4)$$

where $\lambda$ is wavelength of light beam, $\omega_0$ is minimum beam diameter within an exposure surface, L is a distance from a point of the deflecting device from which light beam is reflected, to a center of scanning of the exposure surface, and θ is scanning swing angle (swing angle corresponding to a center of scanning to ends thereof, namely, angle corresponding to zero image height to maximum image height) caused by the deflecting device.

According to the fifth aspect of the present invention, because the beam wavelength, beam diameter, a distance between the deflecting device and exposure surface and scanning swing angle are set so as to satisfy the expression (4), the change in the beam diameter is small, and further the exposure surface is located between the beam waist position in the center of scanning and the beam waist position on both ends of the scanning, the change rate in beam diameter on the sensitive material can be reduced to about ½ and a image excellent in sharpness can be exposed.

According to the sixth aspect of the present invention, there is provided a scanning exposure device according to the first aspect thereof, further comprising focusing elements between the light source and the flat deflecting device, in which the deflecting device is a rotary mirror having one or a plurality of mirror surfaces and a plurality of light beams having different incidence angles and different wavelengths are transmitted upon the deflecting device.

Because the sixth aspect of the present invention is so constructed that a plurality of light beams having different angles of incidence and different wavelengths each are transmitted upon the rotary deflecting device, exposure of color image can be achieved by a smaller number of components, lower cost and smaller device. Further, beam scanning speed is stabilized and an excellent image quality having less change in beam diameter can be obtained.

According to a seventh aspect of the present invention, there is provided a scanning exposure device according to the sixth aspect thereof, in which the plurality of light beams satisfy following expressions (5) and (6):

$$\theta \leq 17° \qquad (5)$$

$$\cos^2\theta + (2\lambda L(1-\cos\theta)/(\pi\omega_0^2))^2 \leq 1.44 \qquad (6)$$

where $\lambda$ is wavelength of light beam, $\omega_0$ is minimum beam diameter within an exposure surface, L is a distance from a point of the deflecting device in which light beam is reflected to a center of scanning on the exposure surface, and θ is a scanning swing angle (swing angle corresponding to a center of scanning to ends thereof, namely, angle corresponding to zero image height to maximum image height) caused by the deflecting device.

Because the seventh aspect of the present invention is so constructed that a plurality of light beams having different angles of incidence and different wavelengths are transmitted upon the rotary deflecting device and the expressions (5) and (6) are satisfied, exposure of color images can be achieved by a smaller number of components, lower cost and smaller device, and further, beam scanning speed is stabilized and an excellent image quality having less change in beam diameter can be obtained.

According to an eight aspect of the present invention, there is provided a scanning exposure device according to the sixth aspect thereof in which a difference between a maximum value and minimum value of the wavelength of the plurality of light beams is more than 100 nm.

According to the eighth aspect of the present invention, because the wavelength of scanning beam for exposure of color image is more than 100 nm, in a case when if an ordinary fθ lens is used, changes in uniformity of scanning speed and beam diameter increases so that excellent images cannot be obtained easily, a smaller number of components, lower cost and smaller size of the device can be achieved. Further, the beam scanning speed is stabilized and an excellent image quality having less change in beam diameter can be obtained.

According to a ninth aspect of the present invention, there is provided a scanning exposure device according to the sixth aspect thereof, in which an angle of incidence to the deflecting device, of each of the plurality of light beams and an angle formed between two of the plurality of light beams are determined so that the plurality of light beams are swept for scanning by means of each of the planes of the flat deflecting device, sequentially on a same exposure plane, and each of light beams is sequentially modulated by a single modulation means during that exposure.

According to the ninth aspect of the present invention, an angle between angles of incidence of respective light beams is set so that a plurality of beams are not focused upon the sensitive material at the same time. Thus upon modulation of light beams according to image signals, a plurality of colors can be sequentially modulated by using the same modulation means. Therefore, with a small device having a simple circuit produced at low cost, excellent scanning exposure can be attained.

According to a tenth aspect of the present invention, there is provided a scanning exposure device according to the sixth aspect thereof, in which optical members having a power only in the direction of sensitive material transportation are disposed for the plurality of light beams, on a side of the light source relative to the deflecting device and on a side of the exposure surface relative to the deflecting device.

According to the tenth aspect of the present invention, optical members having a power only in a direction perpendicular to the beam scanning direction or in the direction of sensitive material transportation is disposed on the side of the light source relative to the deflecting device and on the side of the exposure surface relative to the deflecting device. Thus, upon scanning exposure by using a deflecting device having a plurality of reflecting surfaces, it is possible to reduce unevenness of scanning line pitch due to inclination of each of the reflective planes and then expose an excellent image having little unevenness on the sensitive material.

Because, according to the first to tenth aspects of the present invention, as described above, the flat deflecting device is employed and no optical system for correction is required, such an excellent effect that an excellent focusing characteristic can be achieved is produced.

(Principle of the present invention)

In non-correction scanning of the post objective type using the flat deflecting device, the scanning speed V is expressed in a following expression. Where, as shown in FIG. 1, a distance between the deflecting device and exposure surface is L, half value of the main scanning is X and half value of the swing angle is θ.

$$X = L \tan \theta \qquad (7)$$

$$V = dX/dt = L/\cos^2\theta \qquad (8)$$

Here, a relation between the scanning speed and exposure amount is inversely proportional to each other. Thus, if light beam is moved for scanning of the exposure plane at non-equal speed, upon exposure of the sensitive material, the exposure amount or concentration becomes non-uniform. Referring to FIG. 1, when the scanning speed in the center of scanning line or at a swing angle θ is assumed to be $V_0$, a speed V at the swing angle θ is obtained as follows.

$$V/V_0 = (L/\cos^2\theta)/L = 1/\cos^2\theta \qquad (9)$$

As shown by solid line of FIG. 2, as the swing angle increases, the change in speed also increases. This change in speed can be expressed as a change rate of the exposure rate log E.

$$\Delta \log E = \log(V/V_0) = -\log(\cos^2\theta) \qquad (10)$$

As shown by the broken line of FIG. 2, as the swing angle increases, the change in exposure rate also increases.

As a result of obtaining a limit of concentration change ΔD accompanied by the change in exposure rate, which is allowable as a image through experiment, in the case of low quality image, up to $$\Delta D \leq 0.4 \qquad (11)$$

is allowed. However, in the case of high quality image, only up to $$\Delta D \leq 0.1 \qquad (12)$$

is allowed.

Here, if gamma value of the sensitive material is assumed to be γ, $$\Delta D = \gamma \cdot \Delta \log E \qquad (13)$$

When ordinary silver salt sensitive material is exposed by scanning beam, γ of concentration region in which a change in concentration can be visibly confirmed easily is about 2.5 times. Therefore an allowable amount of change in exposure rate for low quality image is as follows.

$$\log E = \Delta D/\gamma \leq 0.4/2.5 = 0.04/2.5 = 0.16 \qquad (14)$$

Further, the allowable amount of change in exposure rate for high quality image is as follows.

$$\Delta \log E \leq 0.1/2.5 = 0.04 \qquad (15)$$

A relation between θ and Δlog E is shown in Table 1. As evident therefrom, an allowable limit of the swing angle for low quality image is 33°, and that for high quality image is 17°.

| θ (deg) | Δ log E |
|---|---|
| 0 | 0.00000 |
| 1 | 0.00013 |
| 2 | 0.00053 |
| 3 | 0.00119 |
| 4 | 0.00212 |
| 5 | 0.00331 |
| 6 | 0.00477 |
| 7 | 0.00650 |
| 8 | 0.00849 |
| 9 | 0.01076 |
| 10 | 0.01330 |
| 11 | 0.01611 |
| 12 | 0.01919 |
| 13 | 0.02255 |
| 14 | 0.02619 |
| 15 | 0.03011 |
| 16 | 0.03432 |
| 17 | 0.03881 |
| 18 | 0.04359 |
| 19 | 0.04866 |
| 20 | 0.05403 |
| 21 | 0.05970 |
| 22 | 0.06567 |
| 23 | 0.07195 |
| 24 | 0.07854 |
| 25 | 0.08545 |
| 26 | 0.09268 |
| 27 | 0.100238 |
| 28 | 0.108130 |
| 29 | 0.116361 |
| 30 | 0.124939 |
| 31 | 0.133869 |
| 32 | 0.143159 |
| 33 | 0.152817 |
| 34 | 0.162852 |
| 35 | 0.173271 |
| 36 | 0.184085 |
| 37 | 0.195303 |
| 38 | 0.206936 |
| 39 | 0.218995 |
| 40 | 0.231492 |

What has been described above is restriction about change in concentration accompanied by change in speed. Further, to make uniform sharpness of image, it is necessary to consider uniformity of the beam diameter.

The pre-objection type optical system using the fθ lens has been resigned such that the exposure surface is almost coincident with the focusing position or beam waist position.

On the other hand, in a post-objection type optical system, the beam waist becomes circular as shown in FIG. 3. Thus, the exposure surface is not coincident with the beam waist position, so that beam system on the exposure surface is changed depending on the swing angle thereby deteriorating the sharpness of image.

Here, when it is assumed that the beam diameter at beam waist is $\omega_0$, the wavelength of light beam is λ and a distance between a light beam reflection point on the deflecting device and a center of scanning on the exposure surface is L, as shown in FIG. 3, if the beam waist is made coincident with the exposure surface in the center of scanning, the distance $X_1$ between the exposure surface and beam waist when the swing angle is θ, is as follows:

$$X_1 = L((1/\cos\theta) - 1) \qquad (16)$$

At this time, the beam diameter $\omega_0$ on a plane perpendicular to optical axis is as follows:

$$\omega_1 = \omega_0(1+(4\lambda X_1/(\pi\omega_0^2))^2)^{1/2} \qquad (17)$$

However, the beam diameter $\omega$ on the exposure surface is as follows for the optical axis being transmitted at the angle $\theta$:

$$\omega = \omega_0(1+(4\lambda X_1/(\pi\omega_0^2))^2)^{1/2}/\cos\theta \qquad (18)$$

For example, in the case of $\omega_0=80$ nm, a relation between $\omega$ and $\theta$ is as shown in FIG. 4.

Therefore, if the exposure surface is made coincident with the beam waist in the center of scanning, the aforementioned change occurs. However, as shown in FIG. 5, if the exposure surface is located between the beam waist in the center of scanning and beam waist on both ends of scanning so that the beam diameter in the center of scanning is almost equal to the beam diameter on the ends of the scanning, a difference $X_1$ between the beam waist position and exposure surface position can be suppressed to almost half.

As a result of investigating to what extent the change in the beam diameter is allowed as the change in the sharpness of the image experimentally, it has been made evident that about 50% and about 20% are limits for a low quality image and high quality image respectively. In a case when $\omega_0=80$ nm and an allowable change in the beam diameter is 50%, the allowable beam diameter $\omega$ is 120 nm. In this case, the beam diameter ration $\omega/\omega_0$ is 1.5 as understood from FIG. 4. On the other hand, in the case when $\omega_0=80$ nm, and an allowable change in the beam diameter is 20%, the allowable beam diameter $\omega$ is 100 nm. In this case, the beam diameter ratio $\omega/\omega_0$ is 1.2 as understood from FIG. 4.

Therefore, in the case when the exposure surface is disposed at a position shown in FIG. 5, an allowable limit for the low quality image is as follows:

$$\omega/\omega_0 = (1+(2\lambda X_1/(\pi\omega_0^2))^2)^{1/2}/\cos\theta \leq 1.5 \qquad (19)$$

Consequently, $$(\cos^2\theta + (2\lambda L(1-\cos\theta)/(\pi\omega_0^2))^2)^{1/2} \leq 1.5 \qquad (20)$$

$$\cos^2\theta + (2\lambda L(1-\cos\theta)/(\pi\omega_0^2))^2 \leq 2.25 \qquad (21)$$

An allowable limit for the high quality image is as follows:

$$\cos^2\theta + (2\lambda L(1-\cos\theta)/(\pi\omega_0^2))^2 \leq 1.44 \qquad (22)$$

By deflecting beams of three wavelengths by means of the same optical system so as to obtain a plurality of beams having a different wavelength each or particularly color image, a high quality color image can be obtained at low cost. These beams can be deflected by making the optical axes almost coincident with each other by using a dichroic mirror or the like. However, in this case, such an optical part as dichroic mirror for wave synthesis is required. A deviation of position or angle or the like of a wave synthesizing part causes color drift. Thus, these parts need to be fixed and held at a precision more accurate than 1 $\mu$m. Therefore, it is difficult to keep the quality against changes in the environment. Further, because a optical path for wave synthesis is required, there is a disadvantage that the device is enlarged.

A structure for making a plurality of beams be transmitted upon almost the same position on the mirror surface of the deflecting device has been already suggested. However, by utilizing this technology in an optical system not using the f$\theta$ lens like the present invention, high quality color images can be exposed with a smaller device at lower cost.

In a case when the wavelength interval of beams having different wavelengths is large or particularly when the wavelength interval exceeds 100 nm, in a conventional f$\theta$ lens, the focusing position varies depending on the wavelength, because of chromatic aberration and further, uniformity of speed drops. With respect to coating performance of lens, because transmission rate depends on the wavelength and angle of incidence, beams of plural wavelengths in which a difference in wavelength is more than 100 nm, change exposure rate depending on the wavelength. As a result, upon color image exposure, a change in tint may occur. It is preferred to sweep such plural beams having a large difference in wavelength by means of an optical system using no f$\theta$ lens like in the present invention.

The present invention is so constructed that a sum of angles formed between plural beams does not exceed a maximum swing angle which can be deflected, determined by the number of mirror planes. Upon formation of a scanning line on the same mirror surface, a plurality of beams are so constructed as to be swept sequentially for scanning the exposure surface. With this construction, a plurality of beams are not swept for scanning the sensitive material at the same time. Thus, a modulation circuit for modulating each beam can be made common. That is, the device according to the present invention is so constructed that a plurality of beams are sequentially modulated and swept for scanning the exposure surface by means of a single modulation circuit.

BRIEF DESCRIPTION OF THE DRAWINGS

FIG. 1 is a schematic view of a scanning exposure system according to the present invention;

DETAILED DESCRIPTION OF THE PREFERRED EMBODIMENTS

Figure 6:
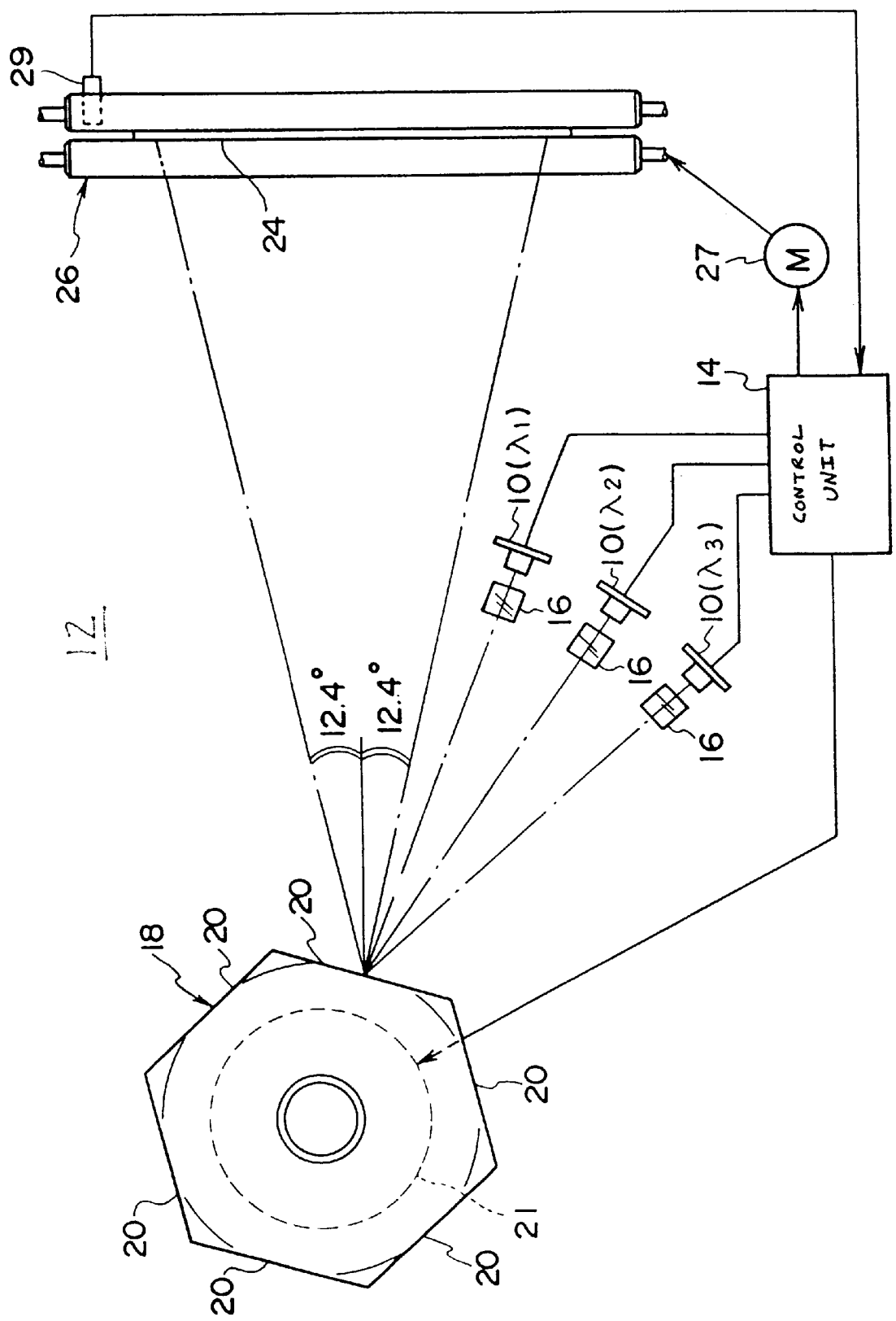
FIG. 6 is a plan view of the scanning exposure device according to the present embodiment.

FIG. 6 shows schematically a scanning exposure device 12 employing three semiconductor lasers 10. The semiconductor lasers 10 are connected to a control unit 14. The semiconductor lasers 10 output laser beam of a predetermined wavelength and a predetermined luminous energy. Laser beams each output from the semiconductor lasers 10 is modulated according to image data stored in a memory (not shown) in the control unit 14. This modulation is pulse duration modulation, in which light exposure to a sensitive material is controlled by duty control. According to this embodiment, the wavelength λ1 of a first semiconductor laser is 810 nm (C), the wavelength λ2 of a second semiconductor laser is 750 nm (M) and the wavelength λ3 of a third semiconductor laser 10 is 680 nm (Y).

A polygon mirror 18 is disposed beyond condensing lens 16 in the downstream of the semiconductor laser 10. The polygon mirror 18 has a plurality of flat mirrors 20 disposed on a periphery thereof. The polygon mirror 18 is a flat deflecting device which is rotated at high speeds by a motor 21 connected to the control unit 14. About light beam output from the semiconductor laser 10, its angle of incidence and angle of reflection are changed within a single flat mirror as the polygon mirror 18 is rotated, so that reflected light beam is moved linearly (main scanning). This main scanning is carried out sequentially by each of the respective flat mirrors 20.

Light beam reflected by the flat mirror 20 of the polygon mirror 18 reaches sensitive material 24 arranged in flat form.

Figure 4:
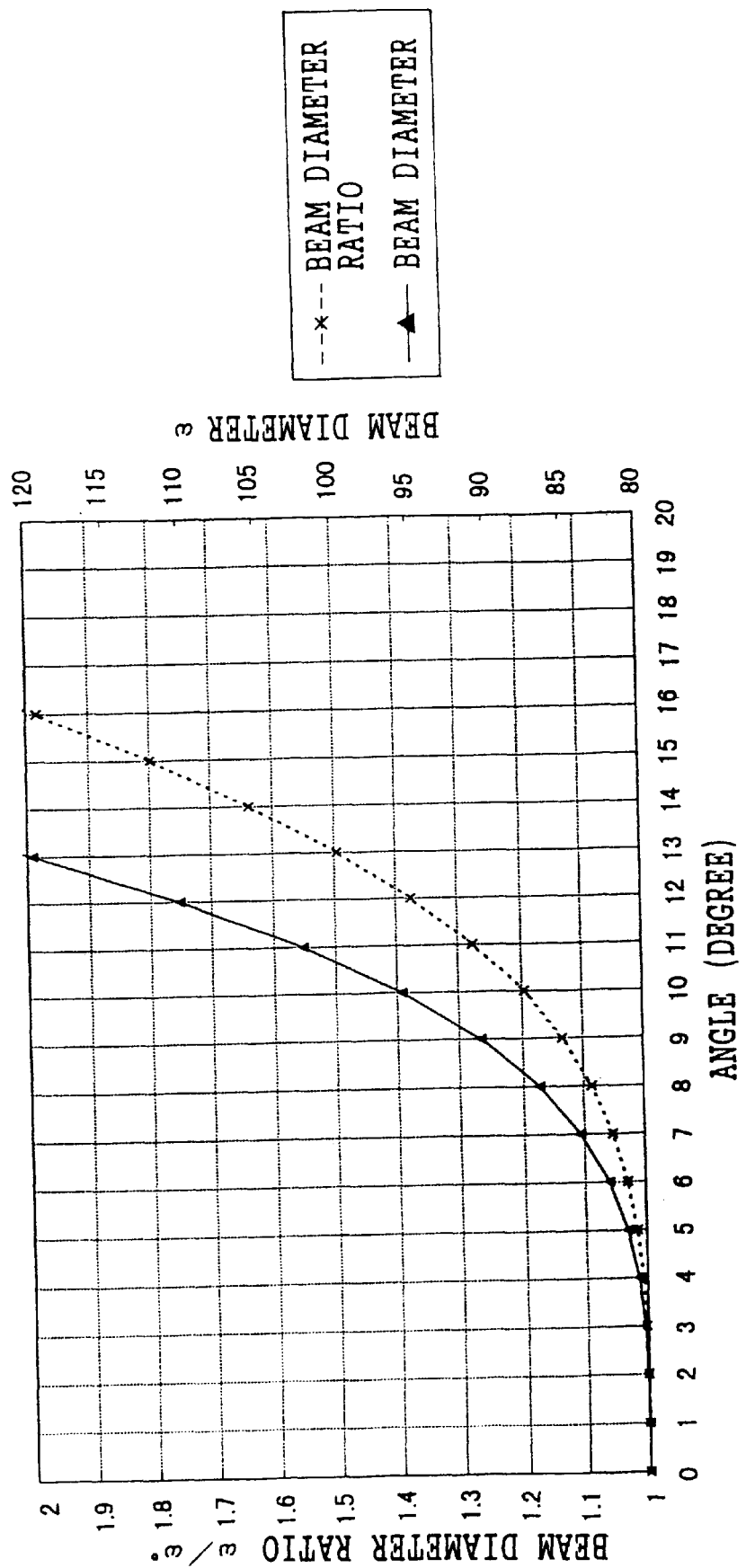
FIG. 4 is a characteristic diagram showing a beam diameter on the sensitive material relative to scanning angle and beam diameter ratio relative to the center of the swing width, according to the present invention.

The sensitive material 24 is nipped by a plurality of pairs of rollers 26 in which the aforementioned main scanning direction is axis line (only a pair thereof indicated in FIG. 4). These rollers 26 are rotated at the same speed by driving force of a motor 27 connected to the control unit 14. As a result, the sensitive material 24 is fed at the same speed in a direction perpendicular to the main scanning direction (auxiliary scanning).

Under this structure, the sensitive material 24 is scanned with the light beam modulated according to image data stored in memory in the control unit 14. Consequently, the image is exposed. A start signal detection sensor 29 is disposed corresponding to a head of a line to be scanned with light beam. The start signal detection sensor 29 obtains outputting timing for the image data by detecting light in the light beam. Actually, modulation is started after a predetermined interval of time has elapsed after the start signal detection sensor 29 detects light.

Figure 3:
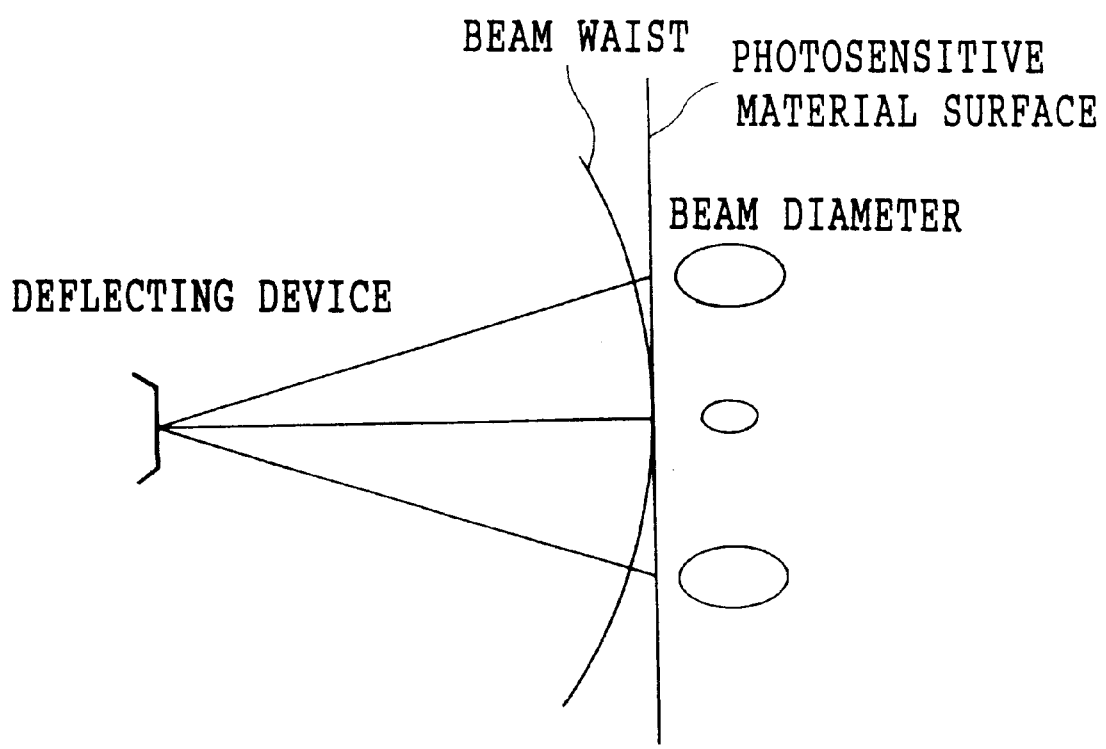
FIG. 3 is a schematic view of a scanning optical system according to the present invention.

As shown in FIG. 3, in a scanning exposure system ordinarily employed in the prior art, scanning is performed with light beam from the polygon mirror 18 (main scanning). A light beam focusing point (beam waist) is located on the same light path of an equal distance from the flat mirror 20 of the polygon mirror 18. Thus, the beam waist forms a circular shape. Thus, if the beam waist in the center of swing width of the main scanning is located on the sensitive material 24, a distance between the beam waist and the sensitive material 24 expands as the beam waist goes toward both ends of the width (main scanning direction) of the sensitive material 24. Because the light beam moves at angular speed motion, the speed of the light beam used for the main scanning on the sensitive material 24 becomes the highest at both ends of the width of the sensitive material 24 and the lowest in the center thereof.

Thus, a part of the maximum swing angle by the flat mirror 20 of the polygon mirror 18 is used as an effective swing angle so as to suppress a deviation of the aforementioned beam waist and a difference of the speeds.

That is, theoretically, a swing angle several times as large as the width of the sensitive material (length necessary for main scanning) 24 is enabled. In the scanning exposure device 12 according to this embodiment, the sensitive material 24 of letter size is maximum size. In terms of concrete numeric data, angle formed between two of the three semiconductor lasers 10 is 13°, a minimum distance from the flat mirror 20 of the polygon mirror 18 to the sensitive material 24 is 250 mm, the length of the sensitive material 24 in the direction of main scanning direction is 105 mm and the effective swing angle of each of the semiconductor lasers 10 is 24.8°. The maximum swing angle by a rotation of the polygon mirror 18 is 120° in a single flat mirror 20.

Figure 7:
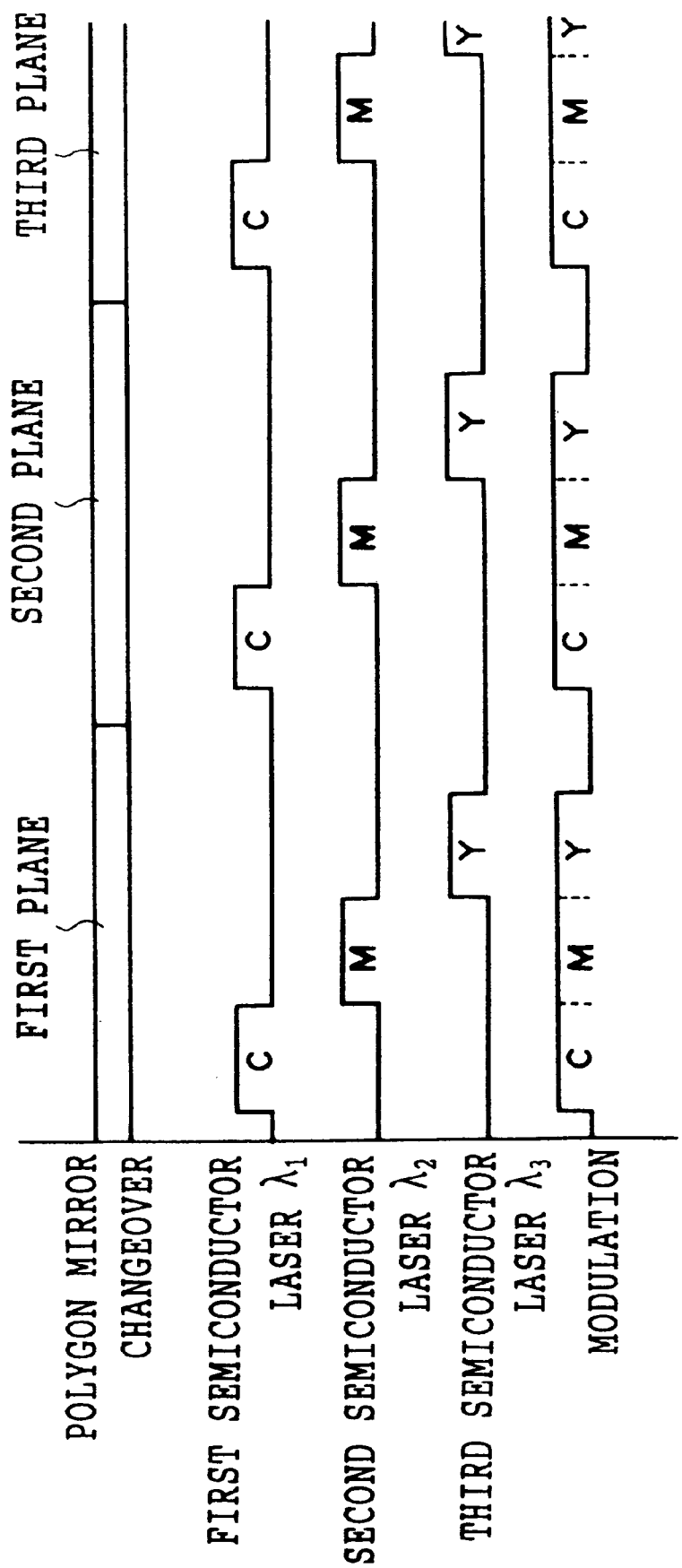
FIG. 7 is an operating timing chart of semiconductor laser output and modulation circuit.

When the polygon mirror 18 is rotated, light beam of the first semiconductor laser 10 having the smallest angle of incidence to the flat mirror 20 reaches the main scanning start position on the sensitive material 24 so that the main scanning is started. After the main scanning by this first semiconductor laser 10 is terminated, light beam of the second semiconductor laser 10 having the second smallest angle of incidence reaches the main scanning start position (same as a position written by the first semiconductor laser 10) of the sensitive material so as to start the main scanning. After the main scanning by the second semiconductor laser 10 is terminated, light beam of the third semiconductor laser 10 having the largest angle of incidence reaches the main scanning start position (same as the position written by the first semiconductor laser 10) of the sensitive material so as to start the main scanning. According to this embodiment, the three semiconductor lasers 10 are not swept for scanning at the same time but swept for scanning sequentially. Thus, in a case when each of the semiconductor lasers 10 is modulated independently, it is not necessary to provide a modulation control circuit for each of the semiconductor lasers 10 and the requirement is satisfied if a single modulation control circuit is provided (see FIG. 7).

An operation of the embodiment according to this embodiment will be described.

When image data is stored in the memory of the control unit 14, scanning exposure to the sensitive material 24 is started according to this image data.

When the polygon mirror 18 is rotated at a high speed, the plurality of the rollers 26 are rotated so as to feed the sensitive material 24 to the scanning exposure position. Light beam is outputted from the semiconductor laser 10. Movement of this sensitive material 24 is for the auxiliary scanning. The sensitive material 24 is moved at the same speed. Here, light beam is detected by the start signal detection sensor 29, the main scanning is started. When a predetermined time has elapsed after the main scanning start is confirmed, the exposure start position is confirmed. When the exposure start position is confirmed, light beam from the semiconductor laser 10 is modulated according to the image data. This light beam is reflected by the flat mirror 20 of the polygon mirror 18 rotated at a high speed. The reflected light beam reaches the sensitive material 24. Of the maximum swing angle (60°) of the light beam which can be physically attained, the effective swing angle (12.4°) on the sensitive material 24 is about ⅕.

The control unit 14 modulates light beam from the first semiconductor laser 10 which reaches a image recording region of the sensitive material 24 ahead of all. By this modulation, a image of the pigment C is exposed on the sensitive material 24.

Next, after scanning exposure by the first semiconductor laser 10 is terminated, light beam outputted from the second semiconductor laser 10 reaches the image recording region. The angle of incidence of the light beam from the second semiconductor laser 10 is deeper than the angle of incidence of light beam outputted from the first semiconductor laser 10. The control unit 14 modulates light beam outputted from the second semiconductor laser 10. By this modulation, a image of the pigment M is exposed on the sensitive material 24.

Likewise, after the scanning exposure by the second semiconductor laser 10 is terminated, the light beam outputted from the third semiconductor laser 10 reaches the image recording region. The angle of incidence of the light beam from the third semiconductor laser 10 is the deepest. The control unit 14 modulates the light beam from the third semiconductor laser 10. By this modulation, a image of the pigment Y is exposed on the sensitive material 24.

The scanning exposure for three pigments is carried out during a single main scanning. To prevent overlapping of the main scanning exposure, an angle between the angle of incidence and each of the semiconductor lasers 10 is determined. Thus, the circuit for modulation in the control unit 14 may be single.

Here, because the beam waist becomes circular as shown in FIG. 3, the beam diameter on the exposure surface is increased as a distance from the beam waist is increased.

The beam waist and exposure position may be made coincident in the center of the image as shown in FIG. 3. Further, a relation between the beam waist and exposure surface position may be set at any position between the center and both ends like other embodiments shown in FIG. 5.

In the former case, the beam diameter is minimum in the center and maximum at both ends. In the latter case, the beam diameter is maximum in the center and both ends while it becomes minimum at an appropriate position therebetween. Thus, in the latter case, the change in the beam diameter can be suppressed at about ½ and therefore is preferred.

In the former case, the distance $X_1$ between the exposure surface and beam waist at the swing angle of $\theta$ is as follows:

$$X_1 = L((1/\cos\theta) - 1) \quad (23)$$

At this time, the beam diameter $\omega_1$ on a plane perpendicular to optical axis is as follows:

$$\omega_1 = \omega_0(1 + (4\lambda X_1/(\pi\omega_0^2))^2)^{1/2} \quad (24)$$

Further, the beam diameter $\omega$ on the exposure plane is as follows because the optical axis is transmitted at an angle $\theta$.

$$\omega = \omega_0(1 + (4\lambda X_1/(\pi\omega_0^2))^2)^{1/2} / \cos\theta \quad (25)$$

Figure 5:
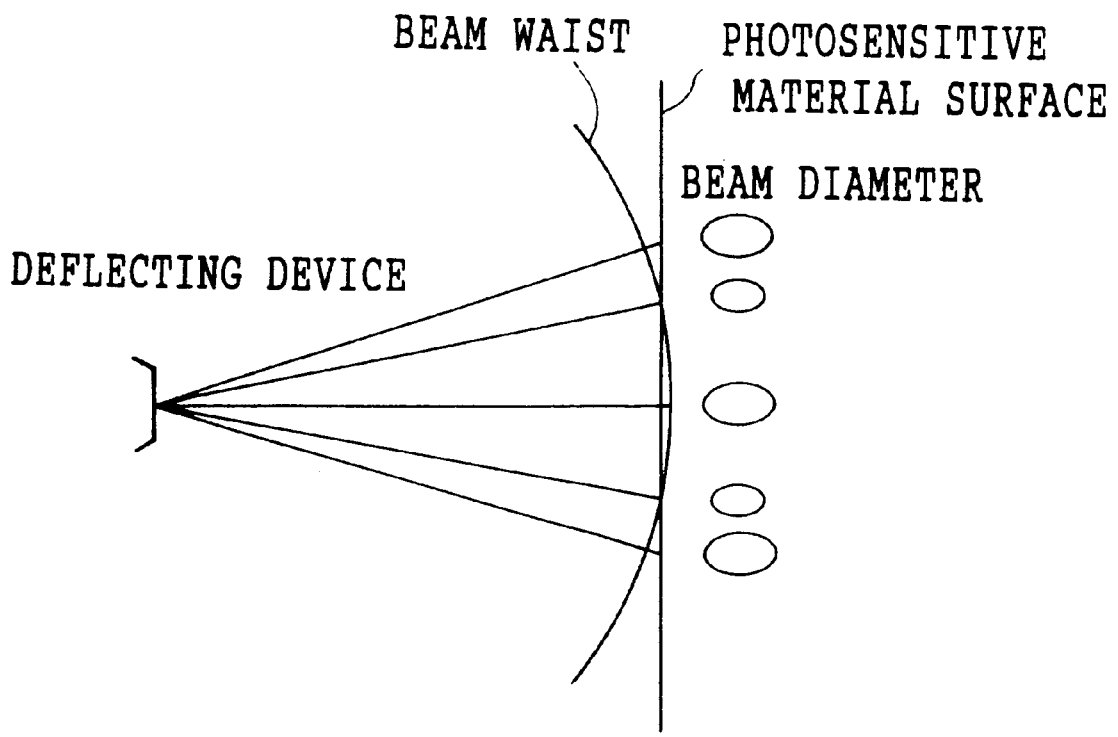
FIG. 5 is a schematic view of the scanning optical system according to another embodiment.

According to this embodiment, when beam diameter of the beam waist in the structure shown in FIG. 5 is 85 μm, the maximum beam diameter can be adjusted to about 91 μm. In this case, the beam diameter is increased by about 7%. However, for low quality images, change in about 50% is allowable limit, and for high quality images, change in about 20% is also allowable limit. The above embodiment has a performance sufficient for the images.

Figure 2:
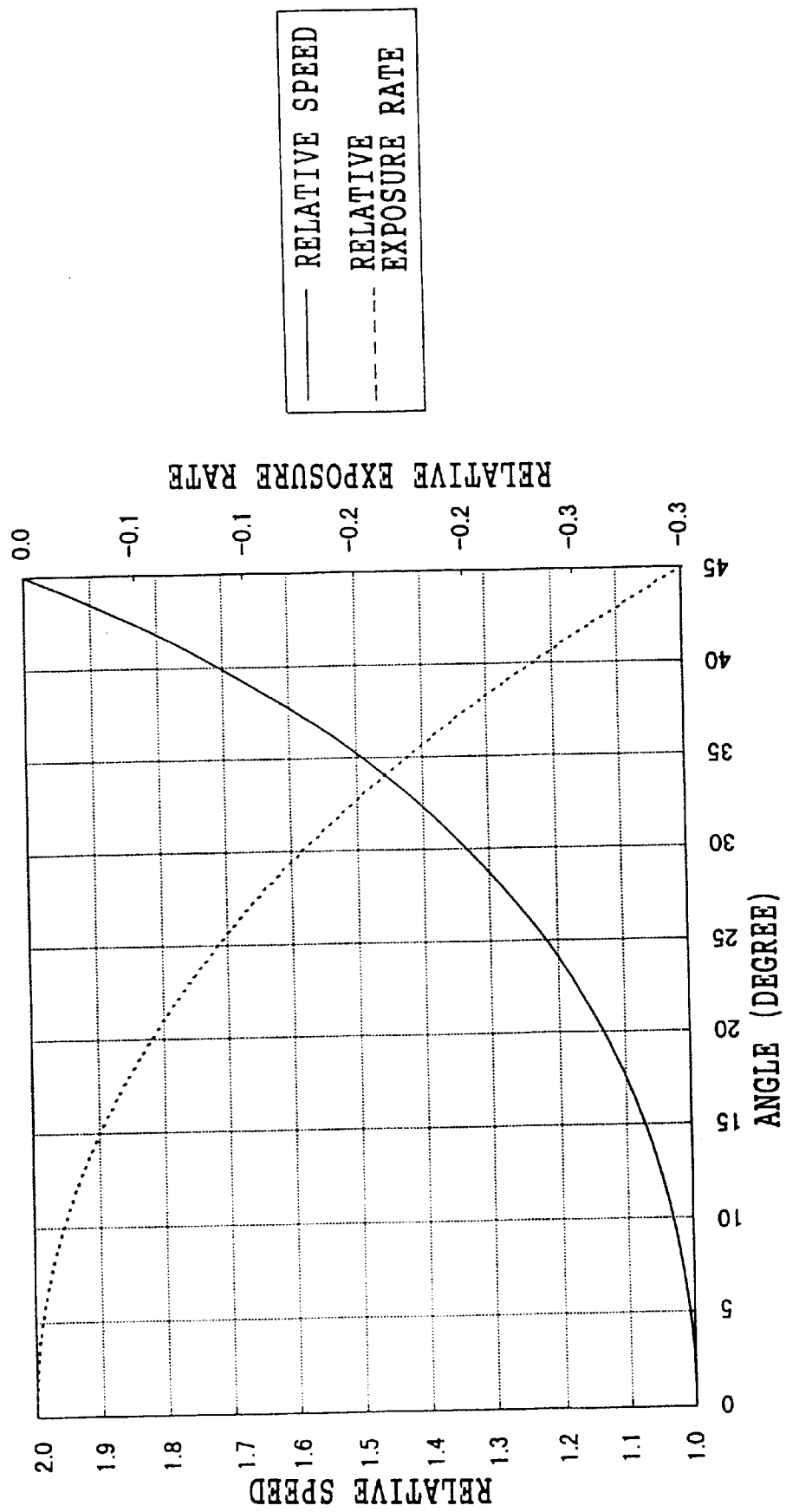
FIG. 2 is a characteristic diagram showing a relation between a relative speed at respective scanning angles relative to a speed in the center of swing width and an exposure rate in the center of the swing width.

Under the swing angle 12.4°, a difference in velocity between the center of the exposure surface and periphery is about 5% by FIG. 2 and a change in exposure rate accompanied thereby is about 2%. In the case when γ of the sensitive material is about 2.5, a difference in concentration between the center and periphery is about 5%, so that this can be allowed sufficiently as a high quality image.

Because the swing angle of light beam by the flat mirror 20 of the polygon mirror 18 is 12.4° for the recording, a deviation of the beam waist and a change in speed can be suppressed, so that the focusing, change in concentration or the like can be incorporated within allowable ranges.

According to this embodiment, the three semiconductor lasers are used to obtain color images. Laser beam from each of the semiconductor lasers has a deviation in wavelength. Thus, the 810 nm laser beam can be 820 nm maximum and 800 nm minimum and the 680 nm laser beam can be 690 nm maximum and 670 nm minimum. In this case, a difference in wavelength deviates from 110 nm to 150 nm. If the difference in wavelength is more than 110 nm, color drift in the three colors due to chromatic aberration and a difference in scanning speed occurs because of the focusing performance of the f$\theta$ lens. Further, the coating of the f$\theta$ lens has wavelength dependency and incidence angle dependency. Therefore, depending on the swing angle or wavelength, a change in transmission rate occurs in the center and both ends of the image, so that a change in tint of color image occurs. Because, according to this embodiment, scanning is performed without using the f$\theta$ lens, these problems do not occur but excellent quality images can be exposed.

In scanning by use of the polygon mirror, there is such a problem that the respective planes may be inclined due to an error in parallelism relative to the rotary shaft. Thus, the focusing position of the scanning line corresponding to each of the planes changes in the direction of sensitive material transportation, so that deviation in gap between the scanning lines occurs. To correct this problem or make the light source, reflection surface of the deflecting device and exposure surface of sensitive material in conjugated relationship, a cylindrical lens is disposed between the light source and deflecting device, and then a cylindrical lens or a cylindrical mirror is disposed between the deflecting device and exposure surface of sensitive material. By means of the cylindrical lens disposed between the light source and deflecting device, light beam dispatched from the light source is focused on a reflective surface of the deflecting device in linear shape. The light beam focused on the reflection surface in linear shape is focused on the exposure surface by means of the cylindrical lens or cylindrical mirror. Thus, deviation of scanning line pitch due to inclination of the deflecting device is reduced so that an excellent quality image can be obtained.

For exposure of color images, it is permissible to use such wavelengths as 780 nm, 680 nm and 635 nm in addition to the wavelength of the above described embodiment. Further, visible three-color lasers or red semiconductor laser and green/blue solid laser may be used. In this case, exposure is conducted with the wavelength of 690 nm to 670 nm for red, 532 nm for green and 473 nm for blue. In this case, a difference in wavelength about the three color beams reaches about 220 nm. If it is intended to obtain an excellent quality image through an ordinary f$\theta$ lens, the number thereof is increased, so that production cost is increased and further as described, the change in tint between the center portion and both ends is increased, thereby deteriorating the image quality. In such a case, application of this embodiment is effective.

Although, in this embodiment, three laser beams are used to expose the color images, in the case of monochrome images, it is needless to say that a single laser can attain its requirement.

Although in this embodiment, relative positions of the respective semiconductor lasers are set to make the circuit for modulation in the control unit 14 single, if the circuit for modulation is set for each of the semiconductor lasers, light beams outputted by a plurality of the semiconductor lasers can be overlapped with each other in time series so as to carry out the scanning exposure.

Further, although, according to this embodiment, the rotary polygon mirror is employed as a flat deflecting device, it is permissible to use a flat type deflecting device in which both the front and rear sides or a single side is of mirror surface. Further, it is permissible to rotate the deflecting device in steps as well as continuously.

What is claimed is:

1. A scanning exposure device having
   a light source,
   a flat deflecting device, comprising a rotary mirror having one or a plurality of mirrors,
   a focusing element, placed between the light source and the flat deflecting device, and
   an exposure surface, over which the flat deflecting device scans light reflected by the flat deflecting device;
   wherein an angle subtended by the scanning of the flat deflecting device is a scanning swing angle not greater than 33°, and
   wherein said light reflected does not pass through any optical elements between the flat deflecting device and the exposure surface.

2. A scanning exposure device having
   a light source,
   a flat deflecting device, comprising a rotary mirror having one or a plurality of mirrors,
   a focusing element, placed between the light source and the flat deflecting device, and
   an exposure surface, over which the flat deflecting device scans light reflected by the flat deflecting device;
   wherein an angle subtended by the scanning of the flat deflecting device is a scanning swing angle not greater than 17°, and
   wherein said light reflected does not pass through any optical elements between the flat deflecting device and the exposure surface.

3. A scanning exposure device having
   a light source,
   a flat deflecting device, comprising a rotary mirror having one or a plurality of mirrors,
   a focusing element, placed between the light source and the flat deflecting device, and
   an exposure surface, over which the flat deflecting device scans light reflected by the flat deflecting device;
   wherein an exposure plane exists between a beam waist position in which and image height is zero and a beam waist position in which the image height is maximal.

4. A scanning exposure device having
   a light source,
   a flat deflecting device, comprising a rotary mirror having one or a plurality of mirrors,
   a focusing element, placed between the light source and the flat deflecting device, and
   an exposure surface, over which the flat deflecting device scans light reflected by the flat deflecting device;
   wherein an angle subtended by the scanning of the flat deflecting device is a scanning swing angle, and satisfies the expression:

$$\cos{}^2\theta+(2\lambda L(1-\cos\theta)/(\pi\omega_0^2))^2<1.44,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

5. A scanning exposure device having
   a light source,
   a flat deflecting device, comprising a rotary mirror having one or a plurality of mirrors,
   a focusing element, placed between the light source and the flat deflecting device, and
   an exposure surface, over which the flat deflecting device scans light reflected by the flat deflecting device;
   wherein an angle subtended by the scanning of the flat deflecting device is a scanning swing angle $\theta$, and $\theta$ satisfies the expression:

$$\cos{}^2\theta+(2\lambda L(1-\cos\theta)/(\pi\omega_0^2))^2<2.25,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

6. A scanning exposure device according to claim 3 wherein an angle subtended by the scanning of the flat deflecting device is a scanning swing angle $\theta$, and $\theta$ satisfies the expression:

$$\cos{}^2\theta+(2\lambda L(1-\cos\theta)/(\pi\omega_0^2))^2<1.44,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

7. A scanning exposure device according to claim 5 wherein the angle subtended by the scanning of the flat deflecting device is not greater than 17°.

8. A scanning exposure device according to claim 3 wherein an angle subtended by the scanning of the flat deflecting device is a scanning swing angle, and satisfies the expression:

$$\cos{}^2\theta+(2\lambda L(1-\cos\theta)/(\pi\omega_0^2))^2<2.25$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

9. A scanning exposure device according to claim 8 wherein the angle subtended by the scanning of the flat deflecting device is not greater than 33°.

10. A scanning exposure device according to claim 1 further comprising:
    a plurality of focusing elements between a plurality of light sources and the flat deflecting device, and
    a plurality of light beams having different wavelengths are transmitted upon said deflecting device at different angles of incidence.

11. A scanning exposure device according to claim 10 wherein the angle subtended by the scanning of the flat deflecting device, for each of said plurality of light beams, is a scanning swing angle $\theta$, and each $\theta$ satisfies the expression:

$$\cos{}^2\theta+(2\lambda L(1-\cos\theta)/(\pi\omega_0^2))^2<2.25,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

12. A scanning exposure device according to claim 10 wherein the angle subtended by the scanning of the flat deflecting device, for each of said plurality of light beams, is a scanning swing angle $\theta$, and each $\theta$ is not greater than 17° and satisfies the expression:

$$\cos^2\theta + (2\lambda L(1-\cos\theta)/(\pi\omega_0^2))^2 < 1.44,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

13. A scanning exposure device according to claim 10 wherein a difference in a maximum and minimum wavelengths of said plurality of light beams is more than 100 nm.

14. A scanning exposure device according to claim 10 wherein the angle of incidence to the deflecting device, of each of said plurality of light beams and the angle formed between two of said plurality of light beams are determined so that said plurality of light beams are swept for scanning by means of each of the planes of the flat deflecting device, sequentially on the same exposure plane and each of the light beams is sequentially modulated by a single modulation means during exposure.

15. A scanning exposure device according to claim 10 wherein optical members having power only in the direction of sensitive material transportation are disposed for said plurality of light beams on a side of the light source relative to the deflecting device and on a side of the exposure surface relative to the deflecting device.

16. A scanning exposure device according to claim 2 further comprising
 a plurality of focusing elements between a plurality of light sources and the flat deflecting device, and
 a plurality of light beams having different incidence angles and different wavelengths are transmitted upon said deflecting device.

17. A scanning exposure device according to claim 16 wherein the angle subtended by the scanning of the flat deflecting device, for each of said plurality of light beams, is a scanning swing angle $\theta$, and each $\theta$ satisfies the expression:

$$\cos^2\theta + (2\lambda L(1-\cos\theta)/(\pi\omega_0^2))^2 < 1.44,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

18. A scanning exposure device according to claim 17 wherein the angle of incidence to the deflecting device, of each of said plurality of light beams and the angle formed between two of said plurality of light beams are determined so that said plurality of light beams are swept for scanning by each of the planes of the flat deflecting device, sequentially on the same exposure plane and each of the light beams is sequentially modulated by a single modulation means during exposure.

19. A scanning exposure device according to claim 3 further comprising:
 a plurality of focusing elements between a plurality of light sources and
 a plurality of light beams having different wavelengths are transmitted upon said deflecting device at different angles of incidence.

20. A scanning exposure device according to claim 19 wherein the angle subtended by the scanning of the flat deflecting device, for each of said plurality of light beams, is a scanning swing angle $\theta$, and each $\theta$ is not greater than 17° and satisfies the expression:

$$\cos^2\theta + (2\lambda L(1-\cos\theta)/(\pi\omega_0^2))^2 < 1.44,$$

where $\lambda$ is the wavelength of the light beam, $\omega_0$ is a minimum beam diameter within the exposure surface, L is the distance from the point of the deflecting device from which the light beam is reflected, to the center of the scanning of the exposure surface.

* * * * *